(12) United States Patent
Dorier et al.

(10) Patent No.: US 11,847,527 B2
(45) Date of Patent: Dec. 19, 2023

(54) VERIFIABLE ACCESS CREDENTIAL

(71) Applicant: SICPA HOLDING SA, Prilly (CH)

(72) Inventors: Jean-Luc Dorier, Bussigny (CH);
Todor Dinoev, Chavannes-près-Renens (CH); Evgeny Loginov, Renens (CH);
Catherine Fankhauser, Genolier (CH);
Kalin Nicolov, Nyon (CH); Bart Suichies, St Legier La Chiesaz (CH);
Claude-Alain Despland, Prilly (CH);
Andrea Callegari, Chavannes-près-Renens (CH)

(73) Assignee: SICPA HOLDING SA, Prilly (CH)

( * ) Notice: Subject to any disclaimer, the term of this patent is extended or adjusted under 35 U.S.C. 154(b) by 226 days.

(21) Appl. No.: 17/434,705

(22) PCT Filed: Feb. 10, 2020

(86) PCT No.: PCT/EP2020/053354
§ 371 (c)(1),
(2) Date: Aug. 27, 2021

(87) PCT Pub. No.: WO2020/173696
PCT Pub. Date: Sep. 3, 2020

(65) Prior Publication Data
US 2022/0171954 A1 Jun. 2, 2022

(30) Foreign Application Priority Data
Feb. 28, 2019 (EP) ..................... 19160137

(51) Int. Cl.
*G06K 19/06* (2006.01)
*G06K 7/14* (2006.01)
(Continued)

(52) U.S. Cl.
CPC ......... *G06K 7/1417* (2013.01); *B42D 25/369* (2014.10); *B42D 25/378* (2014.10);
(Continued)

(58) Field of Classification Search
CPC ....... G06K 19/06028; G06K 19/06037; G06K 19/06187; G06K 19/06056; B42D 25/36; B42D 25/369; B42D 25/373
(Continued)

(56) References Cited

U.S. PATENT DOCUMENTS 4,838,648 A 6/1989 Phillips et al.
5,545,883 A * 8/1996 Sasou ............... G06K 19/06187
235/440

(Continued)

FOREIGN PATENT DOCUMENTS

EP 0686675 2/1998
EP 1666546 6/2006
(Continued)

OTHER PUBLICATIONS

Printing Technology, J. M. Adams and P. A. Dolin, Delmar Thomson Learning, 5th Edition, 2002, p. 293, 332, and 352.
(Continued)

*Primary Examiner* — Paultep Savusdiphol
(74) *Attorney, Agent, or Firm* — Muncy, Geissler, Olds & Lowe, P.C.

(57) ABSTRACT

The invention allows using a commodity hardware (e.g. a smartphone, a tablet, a computer . . . ) to automatically establish a high level of assurance authentication and identification of any government-issued identity document of a user (e.g. identity card, driving license, passport . . . ) and link that to digital identity counterpart. Moreover, the invention allows personalizing a material-based security feature provided of said government-issued identity document to
(Continued)

create a link between the identity document and its data content that can be read by such a commodity hardware and serves as reliable credential for accessing a service once the material-based security feature has been authenticated via the commodity hardware and a signature of the identity data of the user has been authenticated by a server of an authority.

15 Claims, 9 Drawing Sheets

(51) Int. Cl.
    *B42D 25/369*     (2014.01)
    *B42D 25/378*     (2014.01)
(52) U.S. Cl.
    CPC ..... *G06K 7/1413* (2013.01); *G06K 19/06028* (2013.01); *G06K 19/06037* (2013.01)
(58) Field of Classification Search
    USPC .................................. 235/494, 493, 380, 382
    See application file for complete search history.

(56) References Cited

U.S. PATENT DOCUMENTS

| | | | | |
|---|---|---|---|---|
| 5,616,911 | A * | 4/1997 | Jagielinski | G06K 19/12 235/493 |
| 6,759,097 | B2 | 7/2004 | Phillips et al. | |
| 6,838,166 | B2 | 1/2005 | Phillips et al. | |
| 8,025,952 | B2 | 9/2011 | Raksha et al. | |
| 8,343,615 | B2 | 1/2013 | Raksha et al. | |
| 2003/0098995 | A1* | 5/2003 | Ross | G07B 3/00 358/3.28 |
| 2004/0074973 | A1* | 4/2004 | Schneck | B41M 3/144 713/176 |
| 2005/0067497 | A1* | 3/2005 | Jones | G06K 19/07718 235/494 |
| 2007/0170248 | A1* | 7/2007 | Brundage | G07F 7/08 235/380 |
| 2008/0210757 | A1* | 9/2008 | Burden | G06K 19/06187 428/800 |
| 2013/0029112 | A1* | 1/2013 | Bargir | B41M 3/14 347/110 |
| 2013/0084411 | A1 | 4/2013 | Raksha et al. | |
| 2014/0297530 | A1* | 10/2014 | Eckel | G06Q 20/4014 705/44 |
| 2016/0176223 | A1* | 6/2016 | Degott | B41M 1/42 427/595 |
| 2018/0102004 | A1* | 4/2018 | Dezse | G07C 9/15 |
| 2018/0147879 | A1* | 5/2018 | Morton | B81B 7/00 |
| 2019/0039400 | A1* | 2/2019 | Commander | B42D 25/29 |

FOREIGN PATENT DOCUMENTS

| | | |
|---|---|---|
| EP | 1710756 | 10/2006 |
| EP | 1819525 | 3/2010 |
| EP | 2165774 | 3/2010 |
| EP | 2263806 | 12/2010 |
| EP | 2263807 | 12/2010 |
| EP | 2306222 | 4/2011 |
| EP | 2325677 | 5/2011 |
| EP | 2402401 | 1/2012 |
| EP | 1878773 | 8/2012 |
| EP | 1674282 | 6/2013 |
| EP | 2792500 | 10/2014 |
| WO | 02073250 | 9/2002 |
| WO | 03000801 | 1/2003 |
| WO | 2004007095 | 1/2004 |
| WO | 2006078220 | 7/2006 |
| WO | 2007131833 | 11/2007 |
| WO | 2011092502 | 8/2011 |
| WO | 2012104098 | 8/2012 |
| WO | 2014160582 | 10/2014 |
| WO | 2015018663 | 2/2015 |

OTHER PUBLICATIONS

Sharma Gaurav, "Image-based data interfaces revisited: Barcodes and watermarks for the mobile and digital worlds", 2016 8TH International Conference on Communication Systems and Networks (COMSNETS), IEEE, Jan. 5, 2016 (Jan. 5, 2016), p. 1-6.

International Search Report and Written Opinion of International Searching Authority issued with respect to application No. PCT/EP2020/053354.

Written Opinion of International Preliminary Examining Authority issued with respect to application No. PCT/EP2020/053354.

* cited by examiner

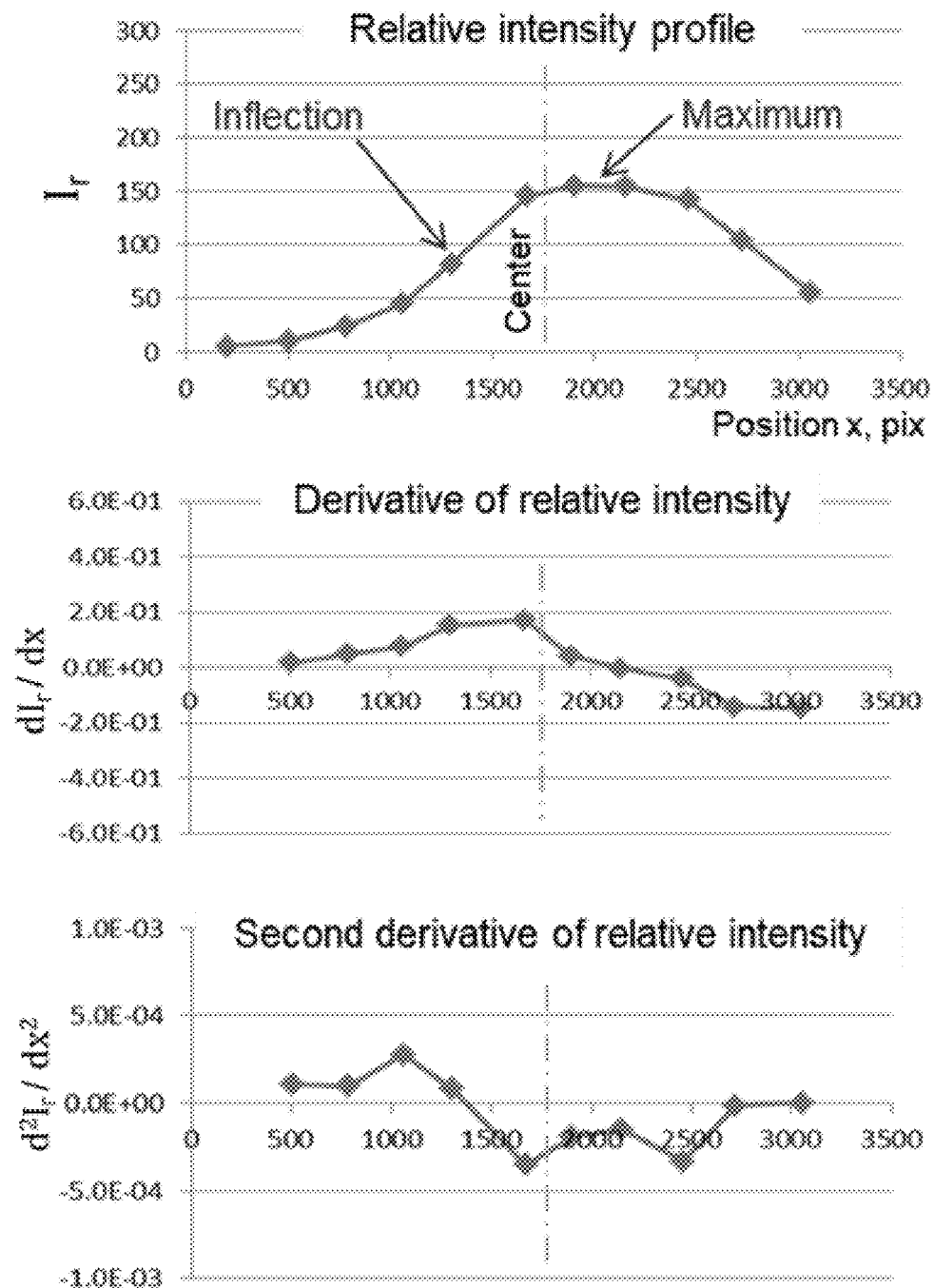

VERIFIABLE ACCESS CREDENTIAL

TECHNICAL FIELD

The present application relates to a verifiable access credential document of a user and a method of using such a verifiable access credential document by the user to access online sites and perform online operations, by using a smartphone or any tablet or computer connected to a communication network.

BACKGROUND OF THE INVENTION

Authorizing access of a user to a given site through a communication network (e.g. internet) to allow the user to perform some operations (e.g. financial operations on a bank account of the user) is well known. Generally, the user has to "prove" his identity by using a private key and/or a password for sending a request to an authority managing the site: only if the password and/or the key is correct, full access to the site is authorized. However, a level of confidence with that sort of access is quite low, as the password or private key can be stolen, or the user may as well be registered before the site (or its control authority) under a false identity. Thus, there is a need for improving a level of confidence of personal access credential.

On the other hand, it is well known to use secured government-issued identity documents (such as identity cards or passports) to prove a holder's identity to a control agent (e.g. at a check-in counter), and then access to some services. In this case, the agent will control some security markings, difficult to counterfeit, provided on the holder's identity document, possibly check a similarity of the holder's face with biometry data and/or an identity photograph, and then, i.e. when the agent has acquired a sufficient level of confidence on the identity of said holder, he allows the holder to perform some authorized operations.

For example, document WO 2014/160582 A1 discloses a method, which includes the steps of: generating an association, at a mobile device, between a government-issued identity document of a user and a mode of payment; receiving, at the mobile device, a presentation of the government-issued identity document of the user to support a request for payment; validating whether the presented government-issued identity document is a valid identification of the user; and in response to validating the presented government-issued identity document, proceeding with payment by using the mode of payment. The government-issued identity document may comprise printed text, magnetic media and a barcode.

There is also known an authentication method applicable for security documents, which is disclosed in document US 2007/170248 A1. The mentioned authentication method includes capturing by a reader an image of a cardholders face. Facial recognition software processes the image to generate a hash. The same reader is used to decode the digital watermark and/or barcode. The digital watermark (and/or barcode) includes a related facial recognition hash. If the hashes match the individual and identification document are authenticated.

WO 2006/078220 A1 discloses an object such as a credit card, bank note, document, label, etc. which carries an identification layer which contains readable information. The identification layer can include randomly distributed conductive/magnetizable particles, semiconductive particle, optically active particles and the like. The identification layer is sandwiched between an upper layer and lower layer to form the object. At least some of the particles are exposed along one edge of the object and can be read by a read head which moves along the edge.

A goal of the invention is to eliminate the necessity of a preliminary identity control via an agent and allow any user to directly access to online services provided by a private or public operator while providing to the operator a high level of confidence with respect to the user's true identity (and thus, true rights to perform operations).

SUMMARY OF THE INVENTION

In view of the above, the invention allows using a commodity hardware (e.g. a smartphone, a tablet, a computer . . . ) to automatically establish a high level of assurance authentication and identification of any government-issued identity document (e.g. identity card, driving license, passport . . . ) and link that to a digital identity counterpart. Moreover, the invention allows personalizing a material-based security feature provided of said government-issued identity document to create a link between the identity document and its data content that can be read by such a commodity hardware.

According to one aspect, the present invention relates to a verifiable access credential document of a user comprising:
  a first zone including printed human readable identity data relating to an identity of the user;
  a second zone with an applied magnetically induced mark having a plane layer of a material including magnetically oriented reflective platelet-shaped magnetic or magnetizable pigment particles;
  a machine-readable marking in a form of a pattern representing encoded data and at least partially applied over the second zone, the encoded data corresponding at least partially to the human readable identity data of the first zone; and
  the machine-readable marking containing a signature of said identity data.

Also described herein are verifiable access credential documents, wherein:
  a) the magnetically induced mark is in the form of a mark comprising magnetically oriented reflective platelet-shaped magnetic or magnetisable pigment particles, said pigment particles comprising a magnetic metal selected from the group consisting of cobalt, iron, gadolinium and nickel; a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof, and
  b) the machine readable marking in the form of a pattern representing a code, which is preferably a 1-dimensional barcode, a stacked 1-dimensional barcode, a 2-dimensional or a 3-dimensional barcode pattern, carrying encoded data, preferably biographic information, and/or biometric information and/or credentials.

Also described herein are verifiable access credential documents, wherein:
  at least a part of the reflective platelet-shaped magnetic or magnetisable pigment particles is constituted by dielectric/reflector/magnetic/reflector/dielectric multilayer structures and/or dielectric/reflector/dielectric/magnetic/reflector/dielectric multilayer structures, preferably $MgF_2$/Al/magnetic/Al/$MgF_2$ multilayer structures and $MgF_2$/Al/$MgF_2$/magnetic/Al/$MgF_2$ multilayer structures wherein the magnetic layer comprises iron, and more preferably comprises a magnetic alloy or mixture of iron and chromium.

Also described herein are verifiable access credential documents, wherein at least a part of the reflective platelet-shaped magnetic or magnetisable pigment particles is constituted by at least partially reflective platelet-shaped color-shifting magnetic or magnetisable pigment particles, preferably magnetic thin-film interference pigment particles.

Also described herein are verifiable access credential documents, wherein the magnetic thin-film interference pigment particles comprise a 5-layer Fabry-Perot absorber/dielectric/reflector/dielectric/absorber multilayer structure wherein the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co) or a 7-layer Fabry-Perot absorber/dielectric/reflector/magnetic/reflector/dielectric/absorber multilayer structure or a 6-layer Fabry-Perot multilayer absorber/dielectric/reflector/magnetic/dielectric/absorber multilayer structure,
  wherein the magnetic layer comprises nickel, iron and/or cobalt; and/or a magnetic alloy comprising nickel, iron and/or cobalt and/or a magnetic oxide comprising nickel, iron and/or cobalt.

Also described herein are verifiable access credential document, wherein the reflective platelet-shaped magnetic or magnetisable pigment particles of the first marking are parallel to each other and have an elevation angle of the pigment particle planes of preferably at least 10° with respect to the plane of the identity document substrate.

Also described herein are verifiable access credential documents, wherein the second marking is a two-dimensional barcode and is preferably a QR-code.

Also described herein are verifiable access credential documents, wherein a dark, preferably a black, primer layer is present between the verifiable access credential document substrate and the first marking.

According to another aspect, the invention relates to a method to verify an access credential document and authorize access to a site of a user described herein, with a portable device equipped with a light source operable to deliver visible light, an imager, a processor with a memory, and a communication unit operable to send and receive data over a communication network, comprising the steps of:
  disposing the imager of the portable device at a given distance L over the second zone;
  illuminating the magnetically induced mark described herein with the light source and acquiring a plurality of digital images of the illuminated magnetically induced mark with the imager, the imager being for each different digital image at a corresponding distinct viewing angle θ with respect to said magnetically induced mark, by moving the imager above the magnetically induced mark in a direction parallel to the plane layer;
  for each acquired digital image, calculating, with the processor, a corresponding average intensity I of the light reflected by the platelets and collected by the imager at corresponding viewing angle θ is determined;
  storing the calculated average intensities of the reflected light and corresponding viewing angles to obtain a reflected light intensity curve I(θ);
  comparing the stored reflected light intensity curve I(θ) with a stored reference reflected light intensity curve Iref(θ) for said magnetically induced mark;
  determining whether the magnetically induced mark is genuine based on a result of the comparison;
  in case the magnetically induced mark is considered as genuine, the user illuminates the machine-readable marking and takes an image of the illuminated machine-readable marking;
  extracting the signature of the identity data from an acquired image of the machine-readable marking described herein;
  sending a message containing the extracted signature via the communication unit to a server, operable to authorize an access to the site, and connected to the communication network;
  checking at the server that the extracted signature matches a corresponding signature of the human readable identity data, and, in case of matching, authorizing access of the user to the site through the communication network to perform operations on this site.

Finally, the invention relates to a hand-held reader equipped with a processor with a memory, a light source, a camera, a display, a communication unit operable to send and receive messages over a communication network, and a computer program product which, when running on the processor, makes the reader operable to perform the steps of the method to verify an access credential document described herein.

The verifiable access credential documents described herein comprises the magnetically induced mark described herein and the pattern representing encoded data, wherein said pattern at least partially overlaps the magnetically induced mark. The magnetically induced mark and the pattern representing encoded data may be advantageously produced at different moments and different locations and may be produced by different means. For example, the magnetically induced mark is typically prepared by a printing process such as those described herein and the pattern representing encoded data may be produced by printing, in particular inkjet printing, by an etching or ablation method. The magnetically induced mark is printed during the mass production of said document and before its personalization with details directed to the owner/user of said document and the pattern representing encoded data is prepared during the personalization. The disclosed embodiments aim at making use of the synergetic effect between the visible magnetically induced mark as an authenticating feature and the second marking as a pattern representing encoded data and allow to verify an access credential document, verify the identifying information of a user and authorize access to a site.

The present invention will be described more fully hereinafter with reference to the accompanying drawings in which like numerals represent like elements throughout the different figures, and in which prominent aspects and features of the invention are illustrated.

BRIEF DESCRIPTION OF DRAWINGS

FIG. 14 is a graphical representation of an intensity profile, its first derivative and second derivative vs the position.

DETAILED DESCRIPTION

Figure 1:
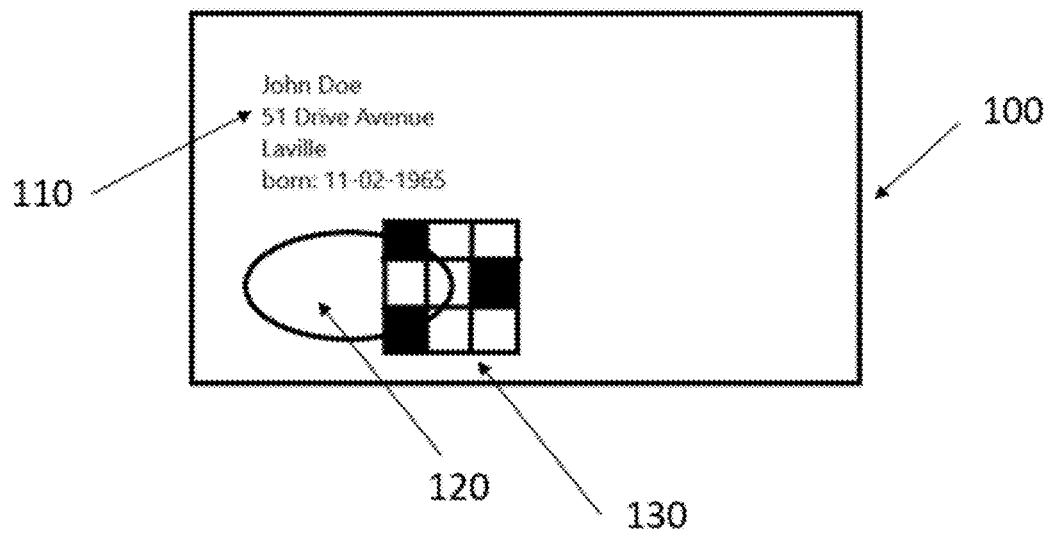
FIG. 1 illustrates a verifiable access credential document according to the invention.

In a preferred embodiment, FIG. 1 shows a verifiable access credential document 100 comprising a first zone including printed human readable identity data relating to an identity of a user 110, a second zone with an applied magnetically induced mark 120 having a plane layer of a material including magnetically oriented reflective platelet-shaped magnetic or magnetizable pigment particles having a preferred orientation, a machine-readable marking 130 in a form of a pattern (here a 2D barcode) representing encoded data and at least partially applied over the second zone, the encoded data corresponding at least partially to the human readable identity data of the first zone, wherein the machine-readable marking 130 contains a signature of said identity data.

The digital signature of the identity data of the user, which may comprise biometric data of the user, is obtained by means of a one-way function of corresponding digital identity data. The one-way function may be a hash function. One such advantageous transformation is, for example, applying a hash function H( )=hash( ) to the digital data, which generally has the property that it returns an output of a known bit length regardless of the size of the input: this technical effect is particularly useful for creating a digital signature of digital data, regardless of the size of the digital data. The Hash function is a well-known example of a one-way function. If a cryptographic hash function such as the SHA (Secure Hash Algorithm) class of functions, for example, SHA-256, is used, then there are the additional benefits that the function is practically irreversible and collision resistant, that is, the probability is negligible that two different inputs will lead to the same output. As will be understood from the description below, this is also not a requirement of the invention, although it is advantageous for the same reasons as in other applications.

The machine-readable marking 130 may be any one of an alphanumeric marking, a 1-D barcode, or a 2D barcode (e.g. DataMatrix, QR code . . . ). Preferably, the machine-readable marking provided on the verifiable access credential document described herein consists of a pattern representing a code which is preferably a 1-dimensional barcode, a stacked 1-dimensional barcode, a 2-dimensional barcode (such as a DataMatrix or a QR-Code), wherein said pattern is readable by a hand-held mobile device described herein. Preferably, said hand-held mobile device is a smartphone.

The machine-readable marking provided on the verifiable access credential document described herein may be any kind of marking or pattern including machine-readable markings, barcodes and the like. Two-dimensional barcodes may include a data matrix or a data matrix symbol and a Quick Response, QR, code (registered trademark) and so on. The barcode may be a barcode according to the GS1 (trademark) data matrix ECC200 standard (GS1 being an international Association providing standards for barcodes). This standard considers the barcode being formed by two types of elements, namely a first type element and a second type element. The elements can be in form of dots or squares and can be provided or formed on the identity document by any suitable means. The machine-readable markings described herein may be produced by any suitable means including printing processes (in particular inkjet printing), etching and ablation methods (in particular laser etching or burning), embossing methods, etc.

The decoding of the machine-readable marking usually begins with taking a (digital) image of said machine-readable marking on the document 100. Such an image is then obtained as digital image data defining respective pixel values for the pixels of the image. This digital image data is then subject to image processing by means of a processing unit (e.g. CPU, Computer, Server, Embedded System, ASIC, etc.). Such processing may be divided into various individual steps for eventually decoding the data that is encoded in the barcode.

The machine-readable marking described herein carries encoded data such as biographic data, biometric data, credentials data, etc. Preferably, the machine-readable marking described herein carries encoded data being biographic data and/or biometric data and/or credentials data. As used herein, the term "biographic information" is used to denote information related to the personal life of a security article user or owner. Typical examples of biographic data or biographic information include without limitation name, surname(s), nationality, place or origin, place of birth, date of birth, gender, personal identity number, and personal social number. As used herein, the term "biometric data" is used to denote a physical characteristic of a security article user or owner. The biometric data may consist of an image or of an alphanumerical description or encoding of the physical characteristic. Typical examples of biometric data include without limitation an image and/or or data corresponding to a biometric data selected from the group consisting of faces, finger prints, palm prints, iris patterns, retina patterns, external ear lobe patterns, vein patterns, blood oxygen levels, bone densities, walking gaits, voices, odor and combinations thereof.

The magnetically induced mark 120 described herein denote layers that comprise at least a plurality of magnetically oriented reflective platelet-shaped magnetic or magnetisable pigment particles, wherein said pigment particles are fixed or frozen (fixed/frozen) in position and orientation.

In contrast to needle-shaped pigment particles which can be considered as one-dimensional particles, platelet-shaped pigment particles are two-dimensional particles due to the large aspect ratio of their dimensions. A platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles.

The magnetically induced marks described herein comprise oriented reflective platelet-shaped magnetic or magnetisable pigment particles that, due to their shape, have non-isotropic reflectivity. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the reflective platelet-shaped magnetic or magnetisable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. Thus, even if the intrinsic reflectivity per unit surface area (e.g. per $\mu m^2$) is uniform across the whole surface of platelet-shaped particle, due to its shape, the reflectivity of the particle is non-isotropic as the visible area of the particle depends on the direction from which it is viewed. As known by the man skilled in the art, the reflective platelet-shaped magnetic or magnetisable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

Suitable examples of reflective platelet-shaped magnetic or magnetisable pigment particles described herein include without limitation pigment particles comprising a magnetic metal selected from the group consisting of cobalt (Co), iron (Fe), gadolinium (Gd) and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of reflective platelet-shaped magnetic or magnetisable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, chromium, cobalt or nickel, wherein said pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the reflective platelet-shaped magnetic or magnetisable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A multilayer structures, wherein the layers A, the magnetic layers M and the layers B are chosen from those described hereabove.

According to one embodiment, at least a part of the reflective platelet-shaped magnetic or magnetisable pigment particles described herein are dielectric/reflector/magnetic/reflector/dielectric multilayer structures and dielectric/reflector/dielectric/magnetic/reflector/dielectric multilayer structures, wherein the reflector layers described herein are independently and preferably made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al), wherein the dielectric layers are independently and preferably made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$), and the magnetic, the magnetic layer preferably comprises nickel (Ni), iron (Fe), chromium (Cr) and/or cobalt (Co); and/or a magnetic alloy comprising nickel (Ni), iron (Fe), chromium (Cr) and/or cobalt (Co); and/or a magnetic oxide comprising nickel (Ni), iron (Fe), chromium (Cr) and/or cobalt (Co). Alternatively, the dielectric/reflector/magnetic/reflector/dielectric multilayer structures and dielectric/reflector/dielectric/magnetic/reflector/dielectric multilayer structures described herein may be multilayer pigment particles being considered as safe for human health and the environment, wherein said the magnetic layer comprises a magnetic alloy having a substantially nickel-free composition including about 40 wt-% to about 90 wt-% iron, about 10 wt-% to about 50 wt-% chromium and about 0 wt-% to about 30 wt-% aluminum. Particularly suitable reflective platelet-shaped magnetic or magnetisable pigment particles having the dielectric/reflector/magnetic/reflector/dielectric multilayer structure include without limitation $MgF_2$/Al/magnetic/Al/$MgF_2$ and $MgF_2$/Al/$MgF_2$/magnetic/Al/$MgF_2$ wherein the magnetic layer comprises iron, preferably comprises a magnetic alloy or mixture of iron and chromium.

Alternatively, the reflective platelet-shaped magnetic or magnetisable pigment particles described herein may be at reflective platelet-shaped colorshifting magnetic or magnetisable, in particular magnetic thin-film interference pigment particles. Colorshifting elements (also referred in the art as goniochromatic elements), such as for example pigments particles, inks, coatings or layers are known in the field of security printing exhibit a viewing-angle or incidence-angle dependent color, and are used to protect security documents against counterfeiting and/or illegal reproduction by commonly available color scanning, printing and copying office equipment.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1 EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers of the Fabry-Perot multilayer structures described herein are independently made from the one or more materials such as those described hereabove. Preferably, the dielectric layers of the Fabry-Perot multilayer structures are independently made from the one or more materials such as those described hereabove Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof.

Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a Cr/$MgF_2$/Al/Ni/Al/$MgF_2$/Cr multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

The dielectric/reflector/magnetic/reflector/dielectric multilayer structures described herein, the absorber/dielectric/reflector/dielectric/absorber multilayer structures described herein, the absorber/dielectric/reflector/magnetic/dielectric/absorber multilayer structures described herein and the absorber/dielectric/reflector/magnetic/reflector/dielectric/absorber multilayer structures described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped magnetic or magnetisable pigment particles which have to be further processed by grinding, milling (such as for example jet milling processes) or any suitable method so as to obtain pigment particles of the required size. The resulting product consists of platelet-shaped magnetic or magnetisable pigment particles with broken edges, irregular shapes and different aspect ratios. Further information on the preparation of suitable pigment particles can be found e.g. in EP 1 710 756 A1 and EP 1 666 546 A1 which are hereby incorporated by reference.

The magnetically induced mark 120 described herein is prepared by a process comprising the steps of a) applying on the verifiable access credential document (when created by a suitable authority) a coating composition comprising the reflective platelet-shaped magnetic or magnetisable pigment particles described herein; b) exposing the coating composition to the magnetic field of a magnetic-field-generating device, thereby orienting at least a part of the reflective platelet-shaped magnetic or magnetisable pigment particles, and c) hardening the coating composition so as to fix the reflective platelet-shaped magnetic or magnetisable pigment particles in their adopted positions and orientations.

Preferably, the coating composition described herein comprises the reflective platelet-shaped magnetic or magnetisable pigment particles described herein dispersed in a binder material, wherein said reflective platelet-shaped magnetic or magnetisable pigment particles are present in an amount from about 2 wt-% to about 40 wt-%, more preferably about 4 wt-% to about 30 wt-%, the weight percents being based on the total weight of the coating composition comprising the binder material, the reflective platelet-shaped magnetic or magnetisable pigment particles and other optional components of the coating composition. The coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The applying step a) described herein is carried out by a printing process preferably selected from the group consisting of screen printing, rotogravure printing and flexography printing. These processes are well-known to the skilled man and are described for example in Printing Technology, J. M. Adams and P. A. Dolin, Delmar Thomson Learning, $5^{th}$ Edition, p 293, 332, and 352.

While the coating composition comprising the reflective platelet-shaped magnetic or magnetisable pigment particles described herein is still wet or soft enough so that said pigment particles therein can be moved and rotated (i.e. while the coating composition is in a first state), the coating composition is subjected to a magnetic field to achieve orientation of the particles. The step of magnetically orienting the reflective platelet-shaped magnetic or magnetisable pigment particles comprises a step of exposing the applied coating composition, while it is "wet" (i.e. still liquid and not too viscous), to a determined magnetic field generated by the magnetic-field-generating device, thereby orienting the reflective platelet-shaped magnetic or magnetisable pigment particles along the field lines of the magnetic field such as to form an orientation pattern.

Subsequently to, partially simultaneously or simultaneously with the application of the coating composition on the substrate surface, the reflective platelet-shaped magnetic or magnetisable pigment particles are oriented by the use of an external magnetic field for orienting them according to a desired orientation pattern. The so-obtained orientation pattern may be any pattern except a random orientation and except a pattern wherein the reflective platelet-shaped magnetic or magnetisable pigment particles have their magnetic axis oriented to be parallel or perpendicular to the identity document on which said particles are applied.

A large variety of magnetically induced marks for decorative and security applications can be produced by various methods disclosed for example in U.S. Pat. No. 6,759,097, EP 2 165 774 A1 and EP 1 878 773 B1. Optical effects known as rolling-bar effects may also be produced. Rolling-bar effects show one or more contrasting bands which appear to move ("roll") as the image is tilted with respect to the viewing angle, said optical effects are based on a specific orientation of magnetic or magnetisable pigment particles, said pigment particles being aligned in a curving fashion, either following a convex curvature (also referred in the art as negative curved orientation) or a concave curvature (also referred in the art as positive curved orientation). Methods for producing rolling-bar effects are disclosed for example in EP 2 263 806 A1, EP 1 674 282 B1, EP 2 263 807 A1, WO 2004/007095 A2 and WO 2012/104098 A1. Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said magnetically induced mark. Methods for producing moving-ring effects are disclosed for example in EP 1 710 756 A1, U.S. Pat. No. 8,343,615, EP 2 306 222 A1, EP 2 325 677 A2, WO 2011/092502 A2 and US 2013/084411.

Figure 2A:
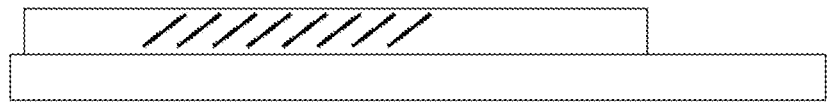
FIG. 2A is a schematic illustration of magnetic orientation pattern wherein the pigment particles have their magnetic axis parallel to each other and parallel to a plane and have an elevation angle of the pigment particle planes of at least 10° with respect to the plane of the substrate onto which the pigment particles are applied (Venetian-blind effect).

Magnetically induced marks known as Venetian-blind effects are shown in FIG. 2A may be produced. Venetian-blind effects include a portion with pigment particles having their magnetic axis parallel to each other and parallel to a plane, wherein said plane is not parallel to the identity document substrate. In particular, optical effects wherein the pigment particles are parallel to each other and have an essentially the same elevation angle of the pigment particle planes of at least 10° with respect to the plane of the substrate onto which the pigment particles are applied. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation. Methods for producing Venetian-blind effects are disclosed for example in U.S. Pat. No. 8,025,952 and EP 1 819 525 B1.

Figure 2B:
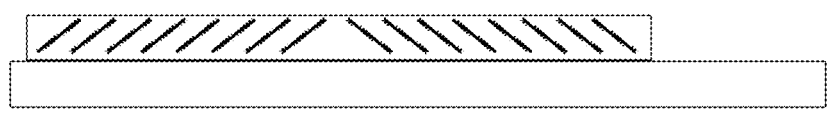
FIG. 2B is a schematic illustration of magnetic orientation pattern with a first portion and a second portion separated by a transition, wherein pigment particles are aligned parallel to a first plane in the first portion and pigment particles in the second portion are aligned parallel to a second plane (flip-flop effect).

Magnetically induced marks known as flip-flop effects (also referred in the art as switching effect) are shown in FIG. 2B and may be produced. Flip-flop effects include a first portion and a second portion separated by a transition, wherein pigment particles are aligned parallel to a first plane in the first portion and pigment particles in the second portion are aligned parallel to a second plane. Methods for producing flip-flop effects are disclosed for example in EP 1 819 525 B1 and EP 1 819 525 B1. Particular suitable orientation patterns include the Venetian-blind effects and the flip-flop effects described hereabove.

The processes for producing the magnetically induced mark described herein comprise, partially simultaneously with step b) or subsequently to step b), a step c) of hardening the coating composition so as to fix the partially reflective platelet-shaped magnetic or magnetisable pigment particles in their adopted positions and orientations in a desired pattern to form the magnetically induced mark, thereby transforming the coating composition to a second state. By this fixing, a solid coating or layer is formed. The term "hardening" refers to processes including the drying or solidifying, reacting, curing, cross-linking or polymerizing the binder components in the applied coating composition, including an optionally present cross-linking agent, an optionally present polymerization initiator, and optionally present further additives, in such a manner that an essentially solid material that adheres to the substrate surface is formed. As mentioned herein, the hardening step c) may be performed by using different means or processes depending on the materials comprised in the coating composition that also comprises the reflective platelet-shaped magnetic or magnetisable pigment particles. The hardening step generally may be any step that increases the viscosity of the coating composition such that a substantially solid material adhering to the supporting surface is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts, and manganese-containing catalysts); cross-linking reactions or any combination thereof. Radiation curing is particularly preferred, and UV-Vis light radiation curing is even more preferred, since these technologies advantageously lead to very fast curing processes and hence drastically decrease the preparation time of any document comprising the magnetically induced marks described herein. Moreover, radiation curing has the advantage of producing an almost instantaneous increase in viscosity of the coating composition after exposure to the curing radiation, thus minimizing any further movement of the particles. In consequence, any loss of information after the magnetic orientation step can essentially be avoided. Particularly preferred is radiation-curing by photo-polymerization, under the influence of actinic light having a wavelength component in the UV or blue part of the electromagnetic spectrum (typically 200 nm to 650 nm; more preferably 200 nm to 420 nm). Equipment for UV-visible-curing may comprise a high-power light-emitting-diode (LED) lamp, or an arc discharge lamp, such as a medium-pressure mercury arc (MPMA) or a metal-vapor arc lamp, as the source of the actinic radiation.

The magnetically induced marks described herein are very difficult to counterfeit, and thus constitute an efficient protection against fraud and contribute to significantly enhance confidence with respect to identity data on the verifiable access credential document.

The verifiable access credential documents described herein may further comprise a primer layer between the identity document substrate and the magnetically induced mark. When present, the primer layer is preferably dark and more preferably black (see FIG. 3).

The machine-readable marking provided on the verifiable access credential document described herein may be any kind of marking or pattern including machine-readable markings, barcodes and the like. Two-dimensional barcodes may include a data matrix or a data matrix symbol and a Quick Response, QR, code (registered trademark) and so on. The barcode may be a barcode according to the GS1 (trademark) data matrix ECC200 standard (GS1 being an international Association providing standards for barcodes). This standard considers the barcode being formed by two types of elements, namely a first type element and a second type element. The elements can be in form of dots or squares and can be provided or formed on the identity document by any suitable means. The machine-readable markings described herein may be produced by any suitable means including printing processes (in particular inkjet printing), etching and ablation methods (in particular laser etching or burning), embossing methods, etc.

Figure 3:
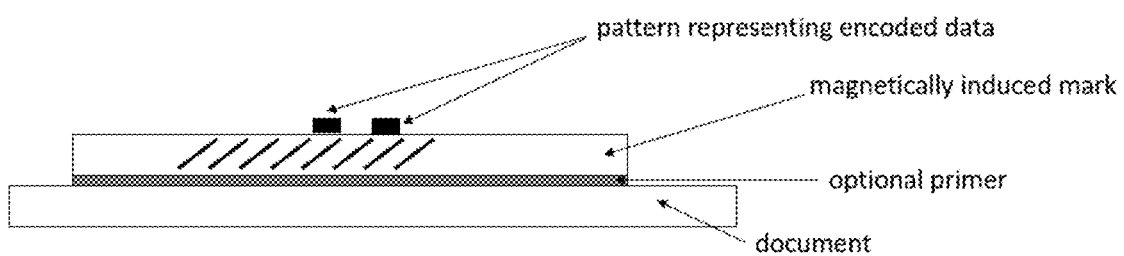
FIG. 3 is a schematic illustration of a marking comprising a magnetically induced mark, a pattern representing encoded data and optionally a primer layer below the magnetically induced mark.

According to one embodiment and as shown in FIG. 3, the verifiable access credential document described herein comprises the magnetically induced mark comprising the magnetically oriented reflective platelet-shaped magnetic or magnetizable pigment particles, the pattern representing encoded data (machine readable marking), said pattern being at least partially overlapping the magnetically induced mark and optionally a primer layer below the magnetically induced mark. For example and as shown in FIG. 2A or 3, the reflective platelet-shaped magnetic or magnetizable pigment particles of the magnetically induced mark are oriented to be parallel to each other and have an elevation angle of the pigment particle planes of at least 10° with respect to the document. The the verifiable access credential document further comprises a dark, preferably a black, primer layer below the magnetically induced mark and comprises a pattern representing encoded data, wherein said pattern is obtained by laser marking using for example a workstation Gravograph Fibre100 (10 W, 1064 nm). The black cells of the pattern are treated by a laser while the white cells are left untreated.

The laser treatment changes the optical properties of the layer, in particular the amount of light that is sent back towards the camera. The zones untreated by the laser have high intensity due strong back reflection from the platelet-shaped magnetic or magnetisable pigment particles, while the zones with laser treatment appear darker as they only scatter smaller part of the flash light in direction to the camera.

According to another embodiment, the verifiable access credential document described herein comprises the magnetically induced mark comprising magnetically oriented reflective platelet-shaped magnetic or magnetizable pigment particles, the pattern representing encoded data, said pattern being at least partially overlapping the magnetically induced mark, wherein the reflective platelet-shaped magnetic or magnetizable pigment particles of the magnetically induced mark oriented to be parallel to each other and have an elevation angle of the pigment particle planes of at least 10° with respect to the document and wherein the pattern representing encoded data is obtained by printing a black ink which may comprise one or more luminescent compounds. The pattern representing encoded data may be applied by a printing process, in particular by drop on demand inkjet, with a resolution between 300 and 600 dpi pi.

The coupling of the machine-readable marking and the magnetically induced mark described herein and shown on FIG. 1 and FIG. 3 advantageously confirm the digital security of the document and prevent an attack combining a magnetically induced mark from a genuine passport and an altered machine-readable marking printed on a separate document.

The decoding of the machine-readable marking usually begins with taking a (digital) image of said marking on the document 100. Such an image is then obtained as digital image data defining respective pixel values for the pixels of the image. This digital image data is then subject to image processing by means of a processing unit (e.g. CPU, Computer, Server, Embedded System, ASIC, etc.). Such processing may be divided into various individual steps for eventually decoding the data that is encoded in the barcode.

The machine-readable marking described herein carries encoded data such as biographic data, biometric data, credentials data, etc. Preferably, the machine-readable marking described herein carries encoded data being biographic data and/or biometric data. As used herein, the term "biographic information" is used to denote information related to the personal life of a security article user or owner. Typical examples of biographic data or biographic information include without limitation name, surname(s), nationality, place or origin, place of birth, date of birth, gender, personal identity number, and personal social number. As used herein, the term "biometric data" is used to denote a physical characteristic of a security article user or owner. The biometric data may consist of an image or of an alphanumerical description or encoding of the physical characteristic. Typical examples of biometric data include without limitation an image and/or or data corresponding to a biometric data selected from the group consisting of faces, finger prints, palm prints, iris patterns, retina patterns, external ear lobe patterns, vein patterns, blood oxygen levels, bone densities, walking gaits, voices, odor and combinations thereof.

Identity documents may typically comprise a special space that is referred to as a machine-readable zone MRZ. In a passport as one possible example for a security article, such a MRZ can be for example a space provided in a lower portion of the identity information page, where the same or corresponding identity information as that is printed on the identity information page is encoded in an optical character recognition format. The MRZ can comprise the biographic information of the user or owner of the identity document and typically consists of two lines having a length of 44 characters. In the MRZ there can be printed and encoded information including identity information, a name, a passport number, check digits, nationality, date of birth, gender, passport expiration date, and personal identity number. The MRZ may further comprises—often country dependent—supplementary information.

In order to better understand the general concept of the disclosure and to point out certain preferable modifications of the general concept, authenticating a mark comprising platelet-shaped magnetic or magnetizable pigment particles with a portable device will be further discussed in more detail.

Figure 4:
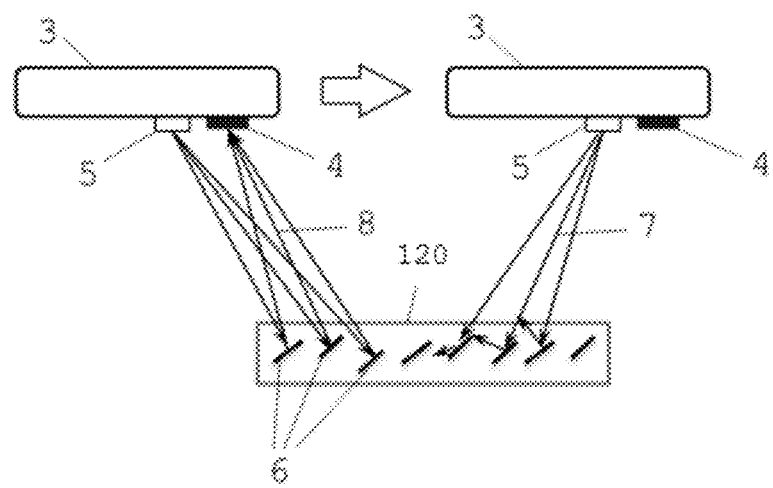
FIG. 4 is a schematic illustration of detecting magnetically oriented partially reflective platelet-shaped magnetic or magnetisable pigment particles of a magnetically induced mark by the smartphone due to particles reflection (or not) depending on its position relative to the mark.
Figure 5:
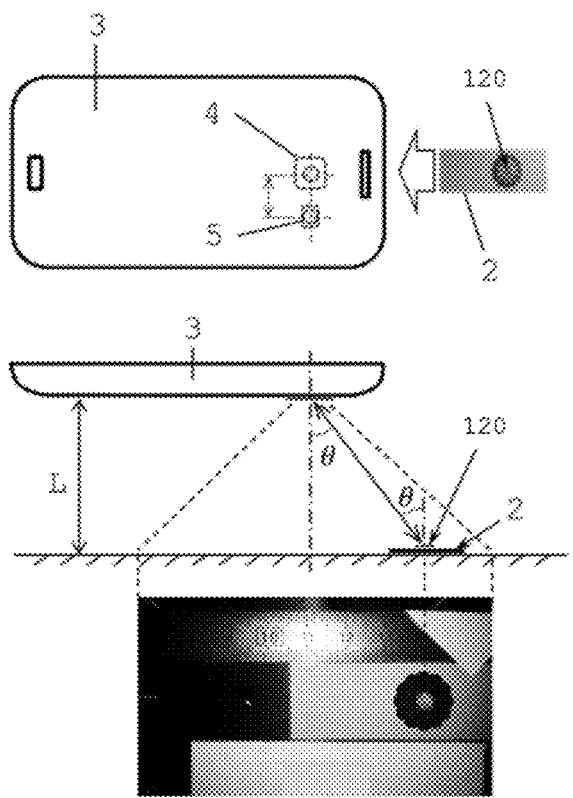
FIG. 5 is an example of a measurement setup with the smartphone and a sample that is scanned in a plane parallel to the smartphone and at fixed distance from the smartphone.

The present method of authenticating magnetically induced marks 120 applied on a substrate 2 via portable device 3 is based on the particular geometrical arrangement of an imager 4, e.g. a smartphone camera, and a light source 5, i.e. a LED flash. On most models of smartphones a camera aperture and the LED flash are located side by side, with a separation of less than 15 mm. Therefore, for a particular magnetic orientation of the platelet-shaped magnetic or magnetizable pigment particles 6 in the mark 1 with respect to the viewing direction, combined with a suitable imaging distance, the geometric condition is fulfilled for the light emitted by the flash, i.e. irradiation 7 to be back reflected to the camera, i.e. reflection 8, whereas for other orientations, the reflection is directed out of the camera. This is illustrated in FIGS. 4 and 5. The smartphone 3 is moved parallel to the substrate 2 at a given distance, L, wherein, for example, L=80 mm, while acquiring a set of images or a video sequence to be used for authentication. Alternatively, the magnetically induced mark 120 is also moved in respect to the smartphone 3 in a parallel plane.

In order to authorize access to a site to the user, the user must dispose the camera of the smartphone at a given distance L over the magnetically induced mark 120 of the second zone. Some guides on the display of the smartphone may help the user to maintain the smartphone at the distance L.

The user illuminates the magnetically induced mark 120 with the light source (generally, a LED) of the smartphone and acquires a plurality of digital images of the illuminated magnetically induced mark with the camera, the camera being for each different digital image at a corresponding distinct viewing angle θ with respect to said magnetically induced mark, by moving the imager above the magnetically induced mark in a direction parallel to the plane layer, as shown on FIGS. 4 and 5.

For each acquired digital image, an application running on the smartphone allows calculating, with the processor, a corresponding average intensity I of the light reflected by the platelets and collected by the imager at corresponding viewing angle θ. Due to the structure of the magnetized platelets, a strong variation in the collected light from the magneticall induced mark, which is higly carateristice of the magneticall induced mark 120.

Figure 6:
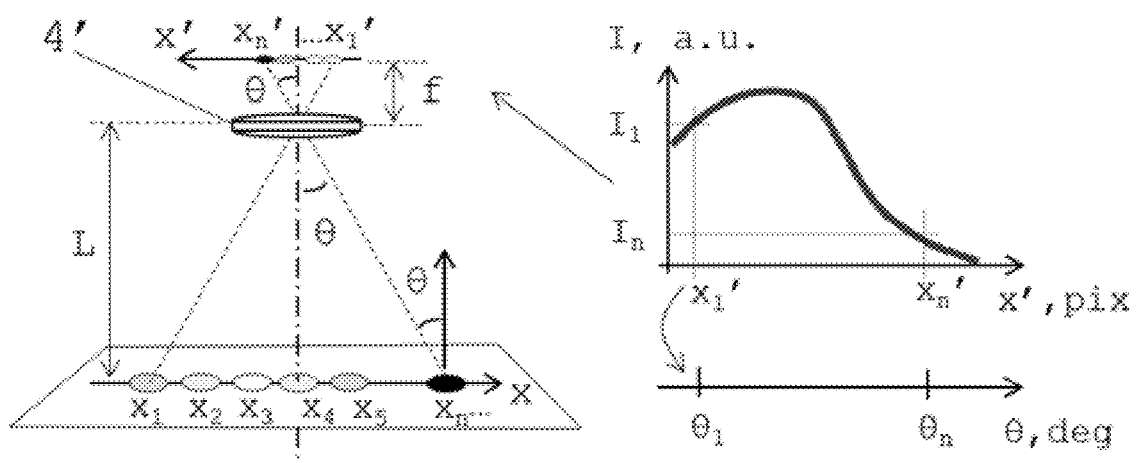
FIG. 6 illustrates the position of the magnetically induced mark in the set of images and an angle of illumination/observation θ for known smartphone to sample distance with graphical representation of intensity profile.

The application running on the smartphone then stores the calculated average intensities of the reflected light, and corresponding viewing angles, to obtain a reflected light intensity curve I(θ) showing a strong characteristic anisotropy (see FIG. 6).

The stored reflected light intensity curve I(θ) is then compared with a stored reference reflected light intensity curve Iref(θ) for said magnetically induced mark.

FIG. 6 illustrates the position $x_1, \ldots x_n$, of the magnetically induced mark in the set of images at a corresponding viewing angle θ for the known smartphone to sample distance L, with the lens of camera with graphical representation of intensity profile of a magnetically induced mark, wherein $I_1 \ldots I_n$ are average intensities at corresponding viewing angle θ.

Figure 7:
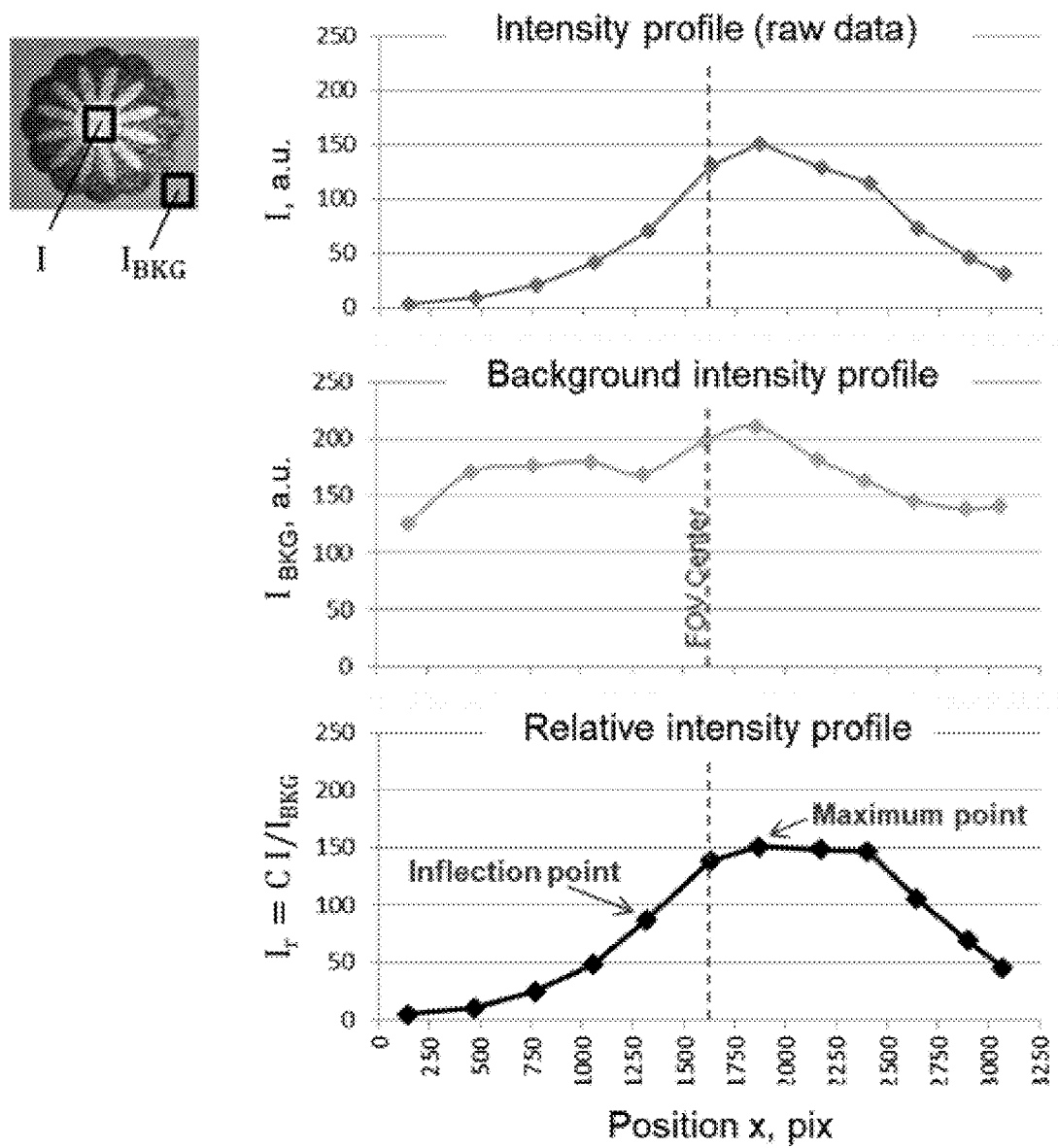
FIG. 7 illustrates intensity and relative intensity profiles of a magnetically induced mark extracted from sequence of images.
Figure 8:
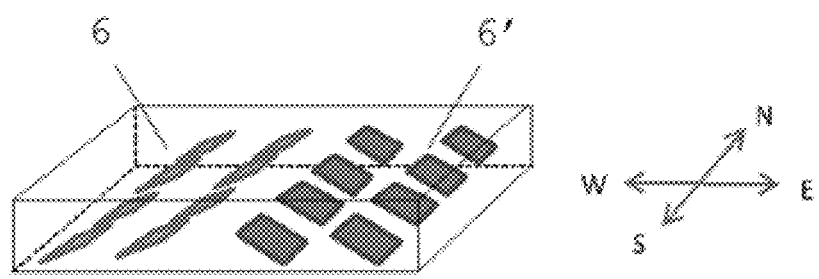
FIG. 8 is a schematic illustration of a magnetically induced mark with magnetically oriented partially reflective platelet-shaped magnetic or magnetisable pigment particles in two opposite directions.

FIG. 7 illustrates intensity and relative intensity profiles of a magnetically induced mark extracted from the sequence of images. The first graph shows non-corrected intensity profile of the magnetically induced mark zone which still represents the effect. The intensity variation of the background (BKG) zone in second graph shows the chaotic phone auto-adjustments. The third graph shows corrected magnetically induced mark intensity profile which reveals the position dependent reflectivity of the mark.

In particular, authenticating is performed by calculating, for each digital image, a corresponding average intensity I of the light reflected by the partially reflective platelet-shaped magnetic or magnetizable pigment particles and collected by the imager at corresponding viewing angle θ;

storing the calculated average intensities of the reflected light and corresponding viewing angles to obtain a reflected light intensity curve I(θ);

comparing the stored reflected light intensity curve I(θ) with a stored reference reflected light intensity curve $I_{ref}(θ)$ for said mark, and determining whether the magnetically induced mark is genuine based on a result of the comparison.

In one proposed embodiment of the invention, the magnetically induced mark is designed so as to exhibit one or more distinct zones, each with a specific orientation of the platelet-shaped magnetic or magnetizable pigment particles. For example, platelet-shaped magnetic or magnetizable pigment particles oriented at 15° to the W direction for the first zone and particles oriented at 15° to the E direction.

Figure 9:
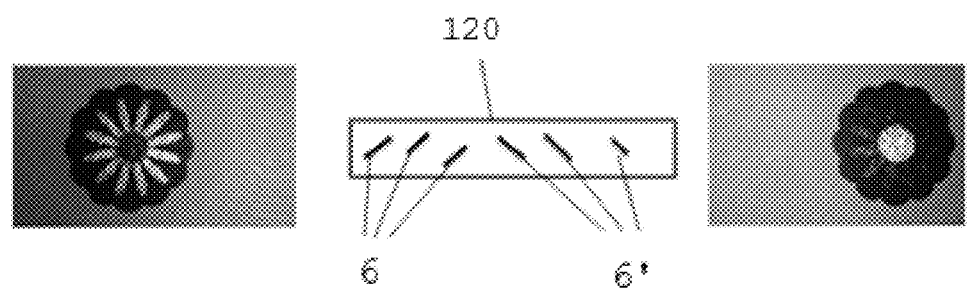
FIG. 9 illustrates a particular printing design of one embodiment of the invention which contains magnetically oriented partially reflective platelet-shaped magnetic or magnetisable pigment particles at two different orientations in different areas of the magnetically induced mark (these two areas could also be superimposed).
Figure 10:
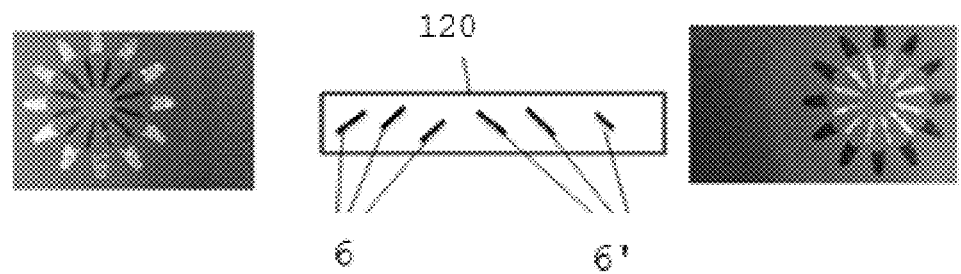
FIG. 10 illustrates a particular printing design of one embodiment of the invention which contains magnetically oriented partially reflective platelet-shaped magnetic or magnetisable pigment particles at two different orientations in different areas of the magnetically induced mark.
Figure 11:
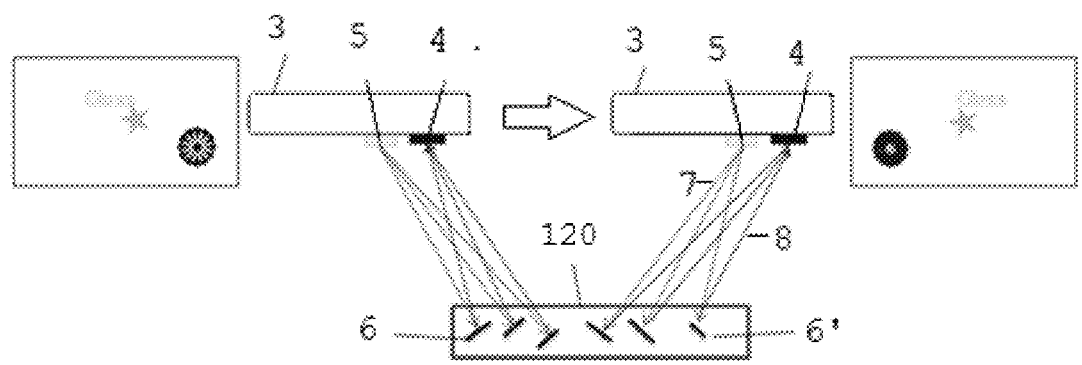
FIG. 11 is a schematic illustration of the smartphone positions over a magnetically induced mark with two different reflective platelet-shaped magnetic or magnetisable pigment particles orientations as shown in FIGS. 8 to 10, along with the obtained image frames in these two positions.
Figure 12:
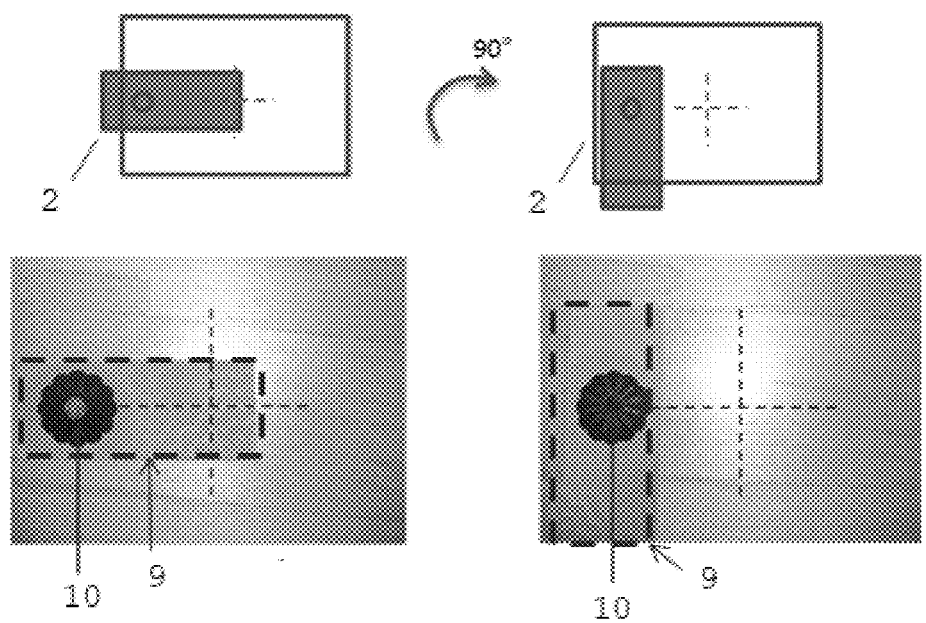
FIG. 12 is a schematic representation of the effect of a 90° rotation of the magnetically induced mark, or of the smartphone in the plane of the mark, and a guiding target on the screen.
Figure 13:
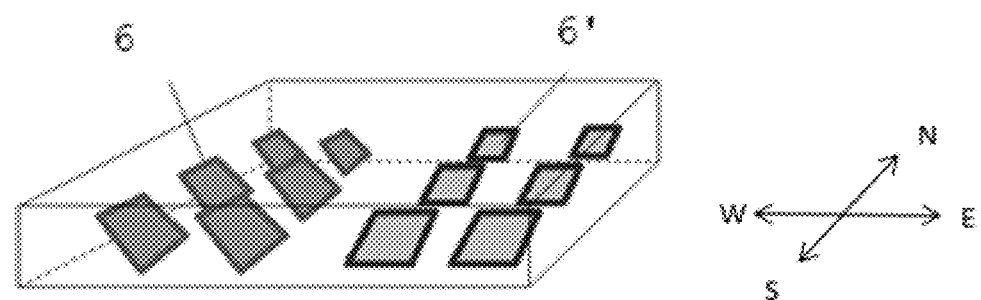
FIG. 13 is a schematic representation of a magnetically induced mark with magnetically oriented partially reflective platelet-shaped magnetic or magnetisable pigment particles in E direction (particles 1) and another class of particles (particles 2) oriented in S direction, at 90° with respect to particles 1.

Examples of such a magnetically induced mark 120 are shown in FIG. 9, illustrating the mark comprising platelet-shaped magnetic or magnetizable pigment particles 6 (petals) and particles 6' (disks)) and in FIG. 10 illustrating the mark comprising particles 6 (outer petals) and particles 6' (inner petals)). In this way reflection can be obtained from particles of the first zone by placing the mark at the right edge of the field of view of the smartphone, whereas reflection of the other zone is obtained by placing the mark at the left edge of the smartphone field of view. This is further demonstrated in FIG. 11 which shows the smartphone positions and the corresponding images obtained in these positions.

The exact location of the mark on the screen preview of the smartphone and the distance of the smartphone to the mark both define precisely the angle at which reflection can be obtained from the platelet-shaped magnetic or magnetizable pigment particles. By providing guiding targets 9 on the smartphone screen preview, the user can easily position the smartphone laterally at the exact location so that the exact angle can be obtained when the viewing distance is also controlled.

The vertical position (viewing distance) can be guided by the size of the target, which should fit the size of the mark at correct distance, or by a second target to be aimed simultaneously at a second mark or a barcode applied besides the magnetically oriented design, or by a written message on the screen prescribing the user to move closer or farther.

This makes the authentication method highly sensitive to the exact platelet-shaped magnetic or magnetizable pigment particles angle and hence allows a good discrimination of potential imitations which would not reproduce the exact orientation.

Authentication is performed by analyzing reflected intensity on the first and second zones of the mark in the two images acquired at the two precise positions of the smartphone, thus confirming the orientation angles. In addition, a sequence of images can be acquired during the movement of the smartphone between the two positions in a direction parallel to a plane layer of the mark. Then the intensity from the two different zones with platelet-shaped magnetic or magnetizable pigment particles oriented in either direction is extracted and recorded as a function of the position. Two intensity profiles are obtained which can be analyzed in a similar way as described in FIG. 14.

In this regard, FIG. 14 shows a graphical representation of intensity profile, its first derivative and second derivative vs the position. First derivative amplitude provides the rate of intensity change and the position of the zero, gives the position of the intensity maximum. The second derivative shows that the intensity profile has two inflection points (inversion).

In a similar embodiment, a video sequence can be acquired during a controlled lateral movement of the smartphone in the plane parallel to the mark. This movement can be guided by augmented reality, where a moving target is displayed on the smartphone display and the user is encouraged to move the phone while maintaining the mark within the target. In this way, the rate of intensity change of the magnetically oriented shining platelet-shaped magnetic or magnetizable pigment particles as a function of the angle of view (calculated from the position of the mark on the screen of the smartphone and the smartphone distance to the mark) can be extracted from the video sequence. This rate of intensity change is a strong authentication parameter, since it is very sensitive to the exact angle at which the platelet-shaped magnetic or magnetizable pigment particles are oriented. Rate of intensity change can be obtained from the first derivative of the profile as illustrated in FIG. 14. The second derivative can also be used as a strong authentication parameter, by allowing to determine the position of the inflection points in the profile. State of the art magnetic orientation can provide angular position of the platelet-shaped magnetic or magnetizable pigment particles down to within +/−2 degrees. Even if a counterfeiter could produce a mark with oriented platelet-shaped magnetic or magnetizable pigment particles, it is not likely that the exact angle of orientation could be obtained and the counterfeited mark can then be detected as fake by this method with high accuracy.

It is also possible to use a video sequence to obtain a relative intensity as function of angle of illumination of the mark that corresponds to position of the mark on the screen during a controlled lateral movement of the phone and in addition to obtain the variance of the pixel intensity within the mark. Both profiles of relative intensity and variance are dependent on the orientation of the platelet-shaped magnetic or magnetizable pigment particles in a magnetically induced mark.

In the method described herein, the application then determines whether the magnetically induced mark is genuine based on a result of the comparison (within a certain error tolerance). Preferably, a message is displayed indicating a result of the comparison. In case the magnetically induced mark is considered as genuine, the user takes an image of the machine-readable marking 130 and the application extracts the signature of the identity data from the acquired image of the machine-readable marking. The extracted signature is then sent in a message, via the communication unit of the smartphone, to a server (of an authority operable to deliver authorization of access to the site) connected to the communication network.

The server then checks that the extracted signature matches a corresponding signature of the human readable identity data, and, in case of matching, authorizes access of the user to a given site through the communication network to perform operations on this site. Preferably, the server sends a message to the smartphone indicating whether the signatures match. Instead of allowing access to the site, the server can sent back to the user an offer for a verifiable credential or a token, this token can then be used in many ways, among others getting access to the site or service (this does not require access to the server going forward).

The invention claimed is:

1. A verifiable access credential document of a user comprising:

a first zone including printed human readable identity data relating to an identity of the user;
a second zone with an applied magnetically induced mark having a plane layer of a material; and
a machine-readable marking in a form of a pattern representing encoded data, the encoded data corresponding at least partially to the human readable identity data of the first zone;
wherein the material of the magnetically induced mark includes magnetically oriented reflective platelet-shaped magnetic or magnetizable pigment particles, and the machine-readable marking contains a signature of said identity data and is at least partially applied directly onto the magnetically induced mark such that the machine-readable marking overlaps at least one area of the layer of the material with the magnetically oriented reflective platelet-shaped magnetic or magnetizable pigment particles.

2. A verifiable access credential document according to claim 1, wherein:
   a) the magnetically induced mark is in the form of a mark comprising magnetically oriented reflective platelet-shaped magnetic or magnetisable pigment particles, said pigment particles comprising a magnetic metal selected from the group consisting of cobalt, iron, gadolinium and nickel; a magnetic alloy of iron, chromium, manganese, cobalt, nickel or a mixture of two or more thereof; a magnetic oxide of chromium, manganese, cobalt, iron, nickel or a mixture of two or more thereof; or a mixture of two or more thereof, and
   b) the machine readable marking is in the form of a pattern representing a 1-dimensional barcode, a stacked 1-dimensional barcode, a 2-dimensional or a 3-dimensional barcode pattern, carrying encoded data.

3. The verifiable access credential document according to claim 2, wherein the encoded data is biographic information, and/or biometric information and/or credentials.

4. The verifiable access credential document according to claim 1, wherein:
   at least a part of the reflective platelet-shaped magnetic or magnetisable pigment particles is constituted by dielectric/reflector/magnetic/reflector/dielectric multilayer structures and/or dielectric/reflector/dielectric/magnetic/reflector/dielectric multilayer structures.

5. The verifiable access credential document according to claim 4, wherein the at least a part of the reflective platelet-shaped magnetic or magnetisable pigment particles is constituted by $MgF_2/Al/magnetic/Al/MgF_2$ multilayer structures and/or $MgF_2/Al/MgF_2/magnetic/Al/MgF_2$ multilayer structures wherein the magnetic layer comprises iron.

6. The verifiable access credential document according to claim 4, wherein the magnetic layer comprises a magnetic alloy or mixture of iron and chromium.

7. The verifiable access credential document according to claim 1, wherein at least a part of the reflective platelet-shaped magnetic or magnetisable pigment particles is constituted by reflective platelet-shaped colorshifting magnetic or magnetisable pigment particles.

8. The verifiable access credential document according to claim 7, wherein the at least a part of the reflective platelet-shaped magnetic or magnetisable pigment particles is constituted by magnetic thin-film interference pigment particles.

9. The verifiable access credential document according to claim 7, wherein the magnetic thin-film interference pigment particles comprise a 5-layer Fabry-Perot absorber/dielectric/reflector/dielectric/absorber multilayer structure wherein the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co) or a 7-layer Fabry-Perot absorber/dielectric/reflector/magnetic/reflector/dielectric/absorber multilayer structure or a 6-layer Fabry-Perot multilayer absorber/dielectric/reflector/magnetic/dielectric/absorber multilayer structure,
   wherein the magnetic layer comprises nickel, iron and/or cobalt; and/or a magnetic alloy comprising nickel, iron and/or cobalt and/or a magnetic oxide comprising nickel, iron and/or cobalt.

10. The verifiable access credential document according to claim 1, wherein the reflective platelet-shaped magnetic or magnetisable pigment particles of the magnetically induced mark are parallel to each other and have an elevation angle of the pigment particle planes of at least 10° with respect to the plane of the identity document substrate.

11. The verifiable access credential document according to claim 1, wherein the machine-readable marking is a QR-code.

12. The verifiable access credential document according to claim 1, wherein a dark primer layer is present between the verifiable access credential document substrate and the magnetically induced mark.

13. The verifiable access credential document according to claim 12, wherein the primer layer is black.

14. A method to verify an access credential document according to claim 1 and authorize access to a site of a user, with a portable device equipped with a light source operable to deliver visible light, an imager, a processor with a memory, and a communication unit operable to send and receive data over a communication network, comprising the steps of:
   disposing the imager of the portable device at a given distance L over the second zone;
   illuminating the magnetically induced mark with the light source and acquiring a plurality of digital images of the illuminated magnetically induced mark with the imager, the imager being for each different digital image at a corresponding distinct viewing angle θ with respect to said magnetically induced mark, by moving the imager above the magnetically induced mark in a direction parallel to the plane layer;
   for each acquired digital image, calculating, with the processor, a corresponding average intensity I of the light reflected by the platelets and collected by the imager at corresponding viewing angle θ;
   storing the calculated average intensities of the reflected light and corresponding viewing angles to obtain a reflected light intensity curve I(θ);
   comparing the stored reflected light intensity curve I(θ) with a stored reference reflected light intensity curve Iref(θ) for said magnetically induced mark;
   determining whether the magnetically induced mark is genuine based on a result of the comparison;
   in case the magnetically induced mark is considered as genuine, the user illuminates the machine-readable marking and takes an image of the illuminated machine-readable marking;
   extracting the signature of the identity data from an acquired image of the machine-readable marking;
   sending a message containing the extracted signature via the communication unit to a server, operable to authorize an access to the site, and connected to the communication network;
   checking at the server that the extracted signature matches a corresponding signature of the human readable identity data, and, in case of matching, authorizing access of the user to the site through the communication network to perform operations on this site.

15. A hand-held reader equipped with a processor with a memory, a light source, a camera, a display, a communication unit operable to send and receive messages over a communication network, and comprising a computer program product which, when running on the processor, makes the reader operable to perform the steps of the method to verify an access credential document according to claim 14.

* * * * *